Nov. 14, 1961 R. A. STEARN Re. 25,081

REAR GATE BOAT HOIST

Original Filed April 16, 1956 4 Sheets-Sheet 1

INVENTOR.
Richard A. Stearn
BY Wilfred S. Stone
Atty.

REAR GATE BOAT HOIST
Original Filed April 16, 1956 4 Sheets-Sheet 2
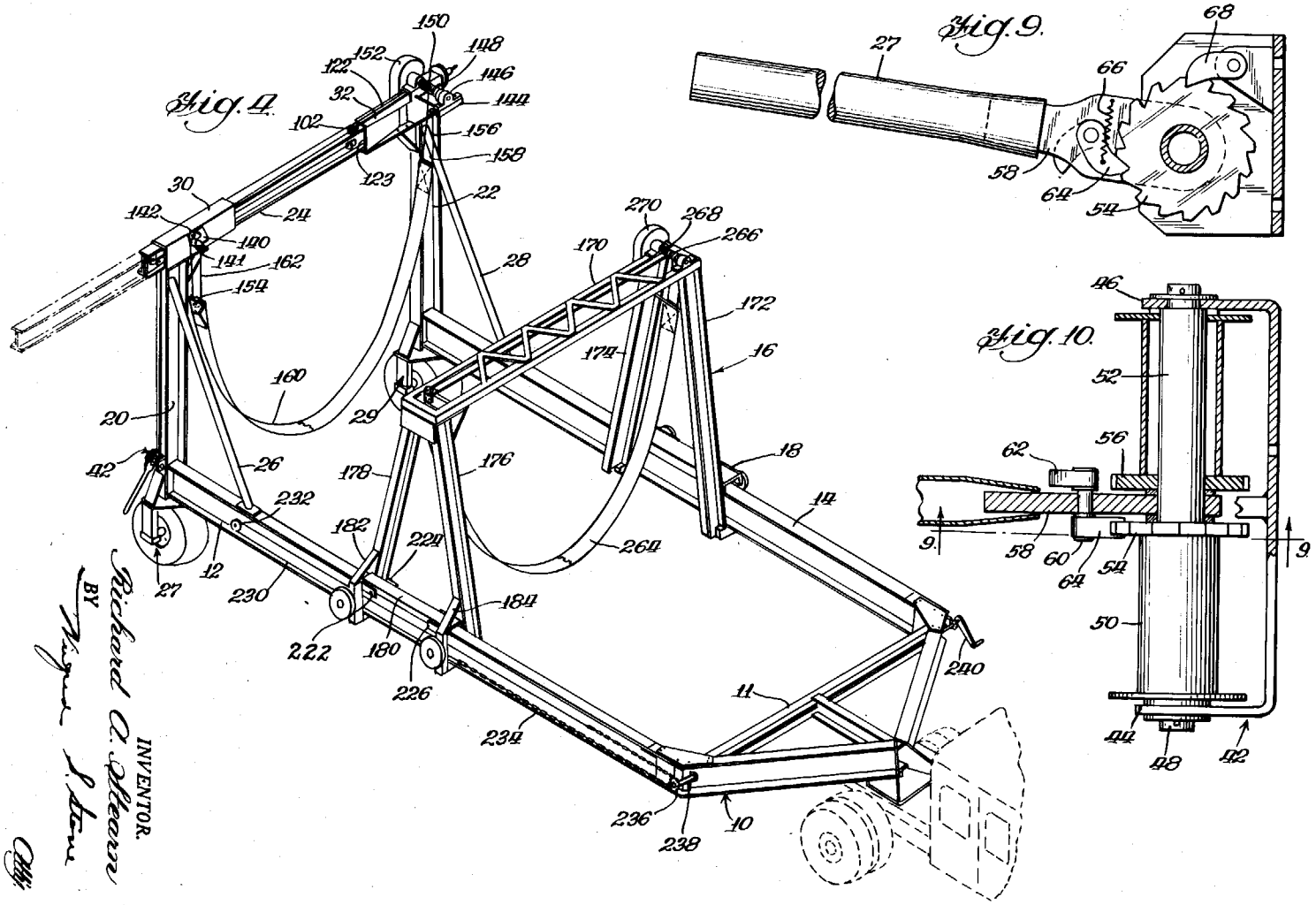
INVENTOR.
Richard A. Stearn
BY
Wingate S. Stone
Atty.

Nov. 14, 1961 R. A. STEARN Re. 25,081
REAR GATE BOAT HOIST
Original Filed April 16, 1956 4 Sheets-Sheet 3
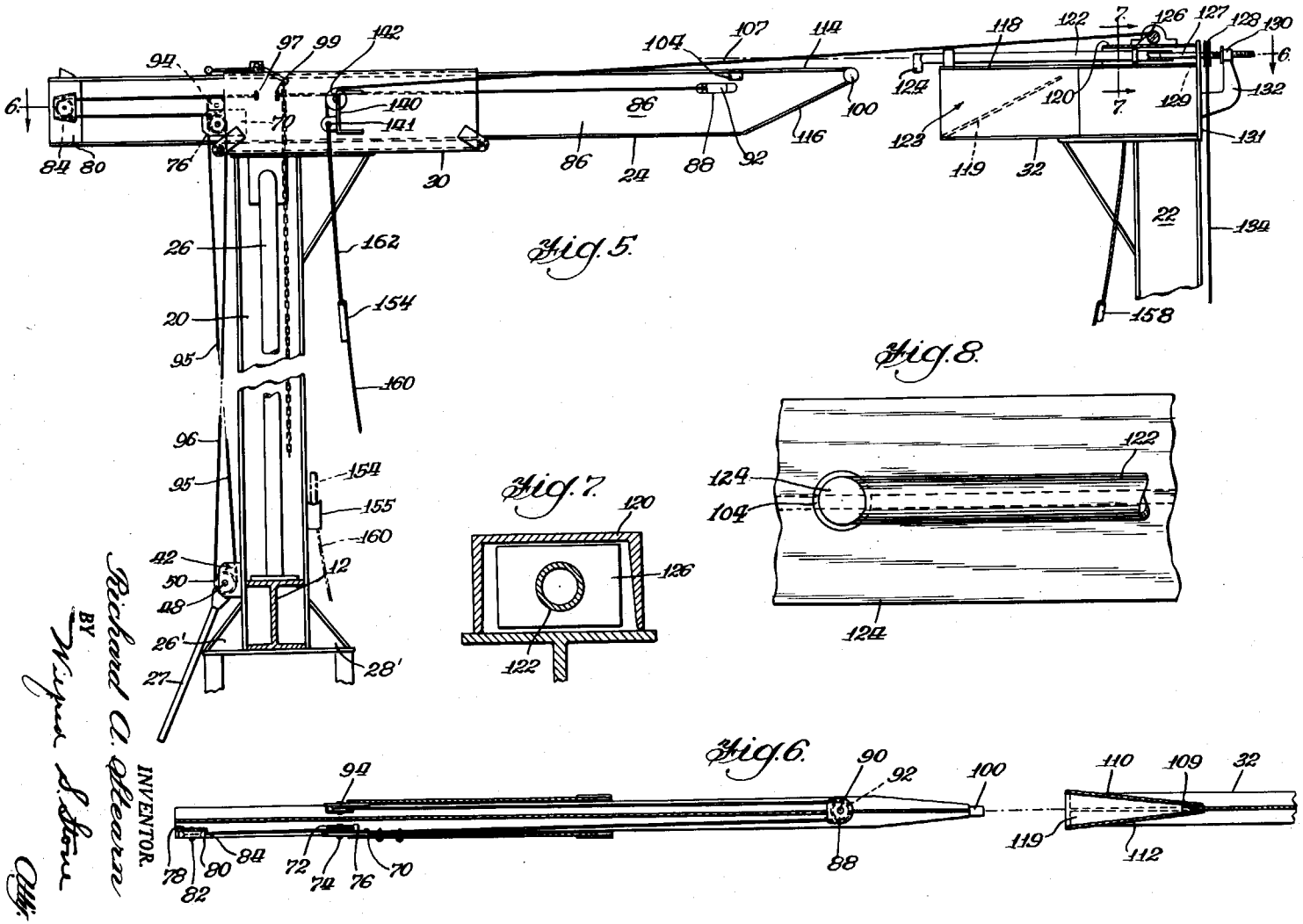
INVENTOR.
Richard A. Stearn
BY
Wilfred S. Stone
Atty.

REAR GATE BOAT HOIST

Original Filed April 16, 1956 4 Sheets-Sheet 4

INVENTOR.
Richard A. Stearn
BY
Wilfred S. Stone
Atty.

United States Patent Office

Re. 25,081
Reissued Nov. 14, 1961

25,081
REAR GATE BOAT HOIST

Richard A. Stearn, Sturgeon Bay, Wis., assignor, by mesne assignments, to Drott Manufacturing Corporation, Milwaukee, Wis., a corporation of Wisconsin Original No. 2,889,061, dated June 2, 1959, Ser. No. 578,490, Apr. 16, 1956. Application for reissue May 24, 1961, Ser. No. 116,232
12 Claims. (Cl. 214—394)

Matter enclosed in heavy brackets [ ] appears in the original patent but forms no part of this reissue specification; matter printed in italics indicates the additions made by reissue.

This invention relates to a boat hoist of the gantry type described by applicant in his copending patent application Serial No. 557,371 filed January 4, 1956. More particularly, it relates to a boat hoist which has an openable rear gate.

In applicant's copending application, his concept of a flat U-shaped base frame carrying upwardly extending gantries which support the slings opened a possiblity for boat hoists which does not exist in the case of existing parallelepiped frame boat hoists. Boat hoists have never been widely used because they can handle only a few of the boats found in the average yard. Particularly, they cannot be used for sailboats unless the masts have been removed. The mast prevents the sailboat from entering the main body of the hoist. The concept of the fixed tail gantry and of the spaced and movable forward gantry with the entire center of the hoist upwardly open suggested the idea of opening the rear gantry to admit a sailboat into the body of the boat hoist and then closing it before actually raising the boat. By opening such a gate, one could float a sailboat into the boat hoist without removing the mast or altering the rigging. In order to close the gate, it might be necessary to remove the rigging.

The problem presented by the rigging is illustrated in schematic FIGURE 1. The numeral 1 identifies the slip filled with water. One pier bears the numeral 2. The ground level is at 3. A sailboat 4 has a mast 5 and its sails are down. The mast is supported by guy wires. Depending from the top of the mast 5 is a cable 15 which holds the boom 17 at its outer end. Assuming that the line 6 represents the maximum draft of the boat, and that the distance from 6 to the ground level 3 is three feet, in order to clear the keel, which is shown in the retracted position, by one foot above the ground level, it is necessary to raise the boat four feet. If the boat hoist is thirty feet long, that is, thirty feet between the wheel 7 and the fifth wheel on the tractor 8, and the cross member 11 of the forward gantry is at its farthest position forward, then the boat hoist cannot be used to raise the boat even though the boat with rigging in place can be positioned between the two cross members of the gantry. The distance 13 is substantially less than the required four feet.

In the disclosure that follows, applicant shows a transversely movable tail gate and suggests a pivoted gate. The latter is pivoted at the top of an upright at the rear corner of he boat hoist. This pivoted or hinged gate can be closed and fastened to the top of the upright on the other rear corner of a boat hoist that functions similarly to the one that is shown in copending application Serial No. 557,371. This pivoted gate is suggested in FIGURE 1 swinging upwardly as 21 or horizontally as 23. Its use is impaired, however, because it is difficult to close the gate so that it occupies the closed position of FIGURE 2, without loosening the rigging to avoid fouling.

A preferred gate is shown in FIGURES 4 to 12. This preferred tail gate is not hinged, but is a sliding bar which is movable horizontally in a line at right angles to the length of the boat hoist between the tops of the two rear uprights. In closed position, it forms the tail gantry. In open position, it extends at right angles to the vertical support and permits a boat's mast and rigging to enter the boat hoist. It will be appreciated that if the boat is not longer than the hoist, the rigging need not be touched. Where the boat is longer, one advances the boat into the hoist until an opening in the rigging is in transverse alignment with the sliding bar. The opening through the rigging must extend downwardly sufficiently so that the boat may be raised. This feature is of great value to the shipyard owner because he is not obliged to wait on the convenience of sportsmen to take down the rigging before the boat is put in a cradle on land.

The advantage of the sliding bar gate is evident from examining the same boat in the same slip in FIGURE 2. Here, the boat hoist has not been backed quite so far out on the pier, with the result that the sliding bar 9 is at a level below the cable 15. Since the space between the cable 15 and the boom 17 and the mast 5 is open, the sail being down, the cross bar can be moved across the space forming the tail gantry and the boat raised out of the water. The boat is shown in raised position in FIGURE 3, and the hoist may now be moved.

In addition to the operational advantage possessed by the sliding bar gate, improved rigidity of the entire rear portion of the frame is obtained because as the disclosure hereinafter shows, a feature of the invention is the movement of the end of the gate into a socket which engages all walls of the end of the gate on all sides. This provides a rigidity which is not as simply obtainable where a gate that swings into position must be locked by bolts or other means.

Providing an openable tail gate on the gantry type boat hoist is the principal and sole object of this invention. However, in providing either a swinging gate or sliding bar, applicant encountered a number of entirely new problems. So long as the transverse bar of a tail gantry is supported by both uprights of the U-shaped frame, torque around the main axes of the I-beams or rails of the U-shaped frame arms is not great. When the transverse member is released from one side and supported only on the other side, the torque on these U-shaped frame arms is sufficient, particularly in the case of the 50-foot hoist, to twist it 90°. This torque can be produced not only by the side carrying the gate, but even the upright on the other side will slightly twist the beam. Comparatively small distortion makes it difficult to unlatch the gate and impossible to close it.

Applicant's first ancillary object is to prevent twisting of the frame rails when the gate is open. This is effected by two features. First, and most importantly, is the substitution of a rectangular beam for the I-beam. As will appear in the disclosure that follows, this rectangular beam is much more resistant to a twisting force around the axis of the beam. Secondly, by rigidly clamping the bottom of the movable gantry to each rectangular beam supporting it, the gantry acts as a truss which limits twisting of the tubular beam to points rearwardly of the point where the movable gantry is locked to the tubular beams.

Another ancillary object of this invention is to provide a means for clamping and locking the transverse tail member rigidly to the top of the tail gantry uprights so as to provide a rigid gantry. While the forward gantry and the rectangular cross section beams are sufficient to hold the rear supports in upright position when the boat hoist is standing vertically over the slip or the cradle, they are wholly insufficient to hold them vertically when load is applied to the rear sling or even to permit pulling the boat hoist around the yard unloaded. The rigidity of the rear gantry is very important. One of the features of the invention is the provision of a transversely mounted upright I-beam which slides between rollers mounted on a rectangular tube mounted on one of the rear gantry uprights.

Another object of this invention is to so space the legs on each side of the forward movable gantry with respect to the weight of an I-beam used as the two horizontal arms of the U-shaped frame that by locking the two spaced legs of the gantry to the I-beam, the laterally, and rearwardly, unsupported length of the I-beam is shortened, thereby enabling the use of a lighter I-beam than would otherwise be required.

These and such other objects as may hereinafter appear are attained in the embodiments of the invention shown in the accompanying drawings, wherein:

FIGURE 4 is a perspective view of applicant's open gate boat hoist;

FIGURE 5 is an inside elevation of applicant's openable gate rear gantry;

FIGURE 6 is a view taken on the line 6—6 of FIGURE 5;

FIGURE 7 is a view taken on the line 7—7 of FIGURE 5;

FIGURE 8 is a plan view of the latch keeper mounted on top of the movable gate;

FIGURE 9 is a view taken on the line 9—9 of FIGURE 10, but partly cut away;

FIGURE 10 is a side view, partly cut away, of the drum and lever assembly for operating the movable gate;

Figure 1:
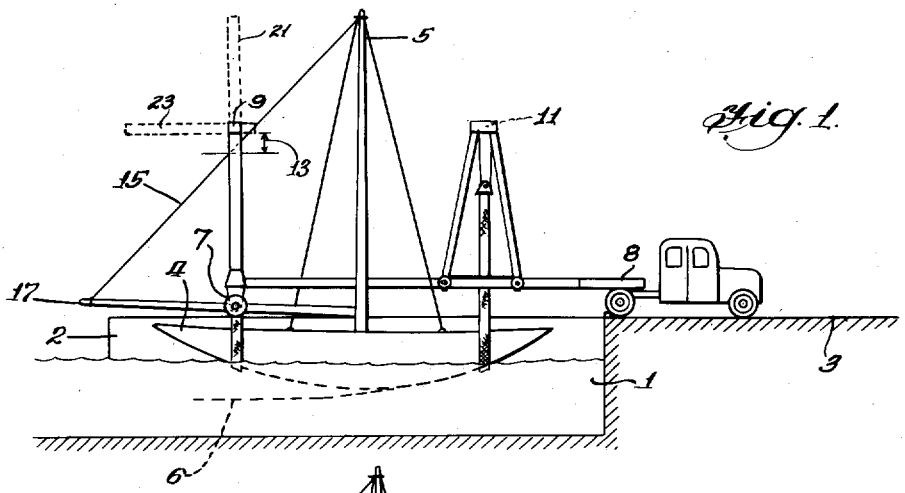
FIGURES 1 to 3 are schematic views illustrating the function of a transversely movable tail gate on a boat hoist.
Figure 2:
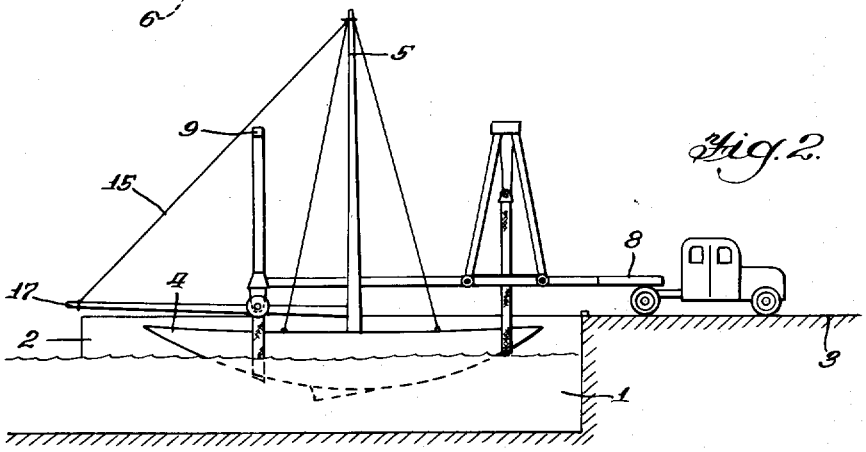

Continuing to refer to the drawings, in FIGURE 4, the general appearance of the rear gate boat hoist is the same as that of the trailer boat hoist in copending application Serial No. 557,371, filed January 4, 1956. A frame 10 has a U-shaped configuration, and comprises a base 11 and elongated members or arms 12 and 14. A movable gantry 16 is mounted on the sleeves such as 18 which slip endwise over the rectangular housing. This will be described in detail hereinafter.

The rear gantry, referring to FIGURES 5 and 6 consists of three sections, two uprights 20 and 22, and a transversely movable cross member 24 which constitute the gate. The uprights such as 20 are fastened to the rectangular rails 12 or 14 and to the wheel assemblies 27 and 29 by braces 26 and 28 and by gussets 26' and 28'. Mounted on the top of upright 20 is a rectangular sleeve 30, and on the top of upright 22 is an I-beam 32 having a socket.

Referring to the sleeve 30, fastened on its outside surface are four pairs of arms or brackets such as 34 and 36, and between each pair are mounted rollers such as 38 and 40. Between these rollers is disposed the I-beam or transverse gate 24 so that it may slide horizontally. Mounted on the outside of the vertical upright 20 is a bracket 42 having arms 44 and 46, see FIGURE 10. Between these arms is disposed a shaft 48 carrying two cable drums 50 and 52. Adjacent the inside edge of the cable drum 50 is a ratchet 54, see also FIGURE 9, and adjacent the inside of the drum 52 is a ratchet 56, returning to FIGURE 10. Mounted centrally of the shaft 48 is a lever arm 58 carrying a transverse pin 60 upon one end of which is mounted a pawl 62 in engageable alignment with the ratchet 56 and another pawl 64 in engageable alignment with the ratchet 54. Referring to FIGURE 9, the pawl 64 is held in engagement with the ratchet 54 by a spring 66 and by moving the pawl 64 past the dead center of the pin 60, the pawl 64 may be held out of engagement with the ratchet. The same arrangement with spring exists for the pawl 62. Referring to FIGURE 9, a pawl 68 may be dropped into the solid-line position and upon a counter-clockwise movement of the ratchet 54, driven by the arm 58 and pawl 64, the pawl 68 will hold the ratchet at any selected notched position. A ratchet similar to 68 but directed in the opposite direction, controls a reverse movement of the ratchet 56. The pawl 68, referring to FIGURE 9, may be rendered inoperable by rotating it slightly over 90°. It is evident that by properly setting the pawls, the drums 50 and 52 may be positively rotated in either direction by means of the arm 58 and locked at any selected point.

Returning to FIGURE 5, mounted on each inside vertical wall of the sleeve 30 is a plate 70 which carries a U-shaped bracket 72, see FIGURE 6, which in turn supports a shaft 74 upon which is disposed a sheave 76.

Mounted between the upper and lower bases of I-beam 24 at the outer end is a plate 78 to which is fastened a spaced plate 80 which together support the shaft 82 upon which is mounted a sheave 84. Disposed in an opening through the web 86 of the I-beam 24 are a pair of plates 88 which hold a shaft 90 on which is disposed a sheave 92. A sheave 94 is mounted on the inside wall of the sleeve 30, referring to FIGURE 6, as is the sheave 76. A cable 96, referring to FIGURE 5, is reeved over the drum 50, see FIGURE 10, also, thence over the sheave 76, returning to FIGURE 5, over the sheave 84, and thence to the inside wall of the sleeve 30 to which it is tacked at 97. The cable 95 is reeled on drum 52, see also FIGURE 10, and is reeved over the sheave 94, thence over the sheave 92, and its end is fastened to the inside wall of the sleeve 30 at 99. Referring to FIGURE 5, by rotating the shaft 48 in a counter-clockwise direction, the cable 96 is reeled in, the cable 95 is unreeled, and the gate 24 is moved to the right. Conversely, by rotating the shaft 48 clockwise, the cable 95 is reeled in, the cable 96 is reeled out, and the gate 24 is pulled to the left.

The end of the transverse member or gate 24 is tapered when viewed from the side or from the top, see FIGURES 5 and 6. It terminates in a cylindrical member 100. Cut into the top flange 114 of the I-beam 86 which constitutes the gate 24, and centered therein so that the web itself is cut away, is a hole in which seats a pipe section 104 which will receive a pin 124 vertically mounted on the end of the bar 122. The pin 124 and the open-ended pipe section 104 cooperate as a latch and latch-keeper.

Referring now to the upright 22 and the I-beam 32 mounted thereon in FIGURE 5, the left-hand end of the web of the I-beam is cut away to the point 109 and is replaced with two plates 110 and 112 which slope toward each other, referring to FIGURE 6, to form a V-configuration terminating with a V-apex at the web just beyond 109. The side edges of the top flange 114, referring to FIGURE 5, and the tapering bottom flange 116 of the gate 24 will nest against the side walls 110 and 112, referring to FIGURE 3, and the top of the flange 114 will engage the under side of the plate 118 which in fact is the uncut-away portion of the base of the I-beam 32. For further rigidity and to limit the entrance of the wedge end of the gate 24, an inclined plate 119 is postioned between the walls 110 and 112.

Mounted on the upper base 118, see FIGURE 5, is an open-ended housing 120 parallel with the length of the I-beam 32. Disposed in this open-ended housing is a tubular rod 122 on the outer end of which is a pin 124 which projects on both sides thereof and is adapted to engage plates 104 and 106 of the keeper 102, see FIGURE 8. Guiding the rod 122 loosely in the channel 120 is a plate 126 mounted on the rod 122. The outer end of the rod 122 is telescoped over a shaft 127 which fits loosely in an opening 129 in an end plate 131 mounted on the end of the I-beam 32. The shaft 127 carries a pulley 128 threaded thereon. The outer end of the shaft 127 is slideably positioned in a bushing 130 mounted on a bracket 132 which in turn is mounted on the end plate 131. A chain 134 is entrained over the pulley 128. A brass washer is positioned on the shaft 127 on each side of the pulley 128. By working the pulley up against the plate 131, it will retract the hollow rod 122 to the right. Conversely, by working the pulley against the bushing 130, the rod 122 can be forced to the left.

The rod 122 must be movable for three or four inches. The trailer is never moved excepting when the gate 24 is in locked position. When the trailer is backed over a slip, however, there may be certain strains imposed upon the locked and closed tail gate. In order to get the boat into the slip, the gate must be open, and if there is an expansion strain on the two uprights 20 and 22, the gate 24 will work somewhat out of alignment with the wedge socket 123.

Returning to FIGURES 4 and 5, mounted on the forward side of the sleeve 30 is a bracket 140 which carries a pulley 142. Mounted on the upright 22 is a shelf 144 upon which is positioned a shaft 146 carrying cable drums 148 and 150. This shaft is driven through a gear box 152 by a motor, not shown, on the far side of the upright 22. The cable over the drum 150 is reeved over the pulley 142 and thence around the pulley 154 to an anchorage point 141 on the bracket 140. Reeled on the other drum 148 is a cable 156 which is reeved over a pulley 158 and anchored to the sleeve 32. A sling 160 is suspended between two pulley assemblies 154 and 158. In order to open the gate, it is necessary to disconnect the cable 162 and to hang both ends of the sling on the same upright, either 20 or 22.

Normally, the gate 24 is in closed, locked position. The trailer hoist is not to be moved at any time with the gate open, nor the boat hoisted. Bending moments away from the vertical are imposed on the upright 20 the moment that the gate 24 ceases to be locked in the wedge recess 123. The extent of these forces depends upon the degree of unbalance created by the particular position of the gate 24 with respect to the upright 20.

The trailer hoist with the gantry 16 locked to the rails 12 and 14 and the gate 24 locking the two uprights 20 and 22 together, is backed over the slip as illustrated in FIGURE 1.

Returning to FIGURE 4, the cable 162 is disconected at the dead end at 141 from the bracket 140, is slipped free of the pulley and the pulley block 154, is next lifted off the sheave 142, and dropped into the water. At the time that the cable 162 is disconnected from the pulley block 154, referring to FIGURE 5, the latter with the sling 160 is rested in a holder 155 mounted near the lower part of the upright 20 so that the sling will be under the boat as the boat is moved into the slip.

The next step is to operate the chain 134 so as to move the locking pin 124 to the left as viewed in FIGURE 5. The entire drum assembly indicated by the numeral 42 is placed in freely rotatable position, so that the movement of pin 124 to the left pushes the movable gate 24 through the pipe section 104 to the left. As this movement continues, the weight of the gate causes the end that is being freed to hang downwardly increasingly as the surface 116 slides downwardly along the surface 119. This continues until the pin 124 clears the pipe section 104. When this happens, the operator completes the retraction of the gate by means of the lever 27 and cables 95 and 96. The boat is then moved into the slip. The cable 162 is then retrieved from the side of the slip adjacent the upright 22, reeved over the sheave 142, and thence over the sheave and the pulley block 154 to restore the arrangement shown in FIGURE 5.

The forward gantry may be released and moved forward to the best position for engaging the bow of the particular boat that is to be raised. Better practice, however, is to position and lock the forward gantry longitudinally of the rails 12 and 14 before the rear gate is opened so that when that gate is open, the movable gantry will be useful for resisting twisting of the rear gantry uprights 20 and 22.

Figure 3:
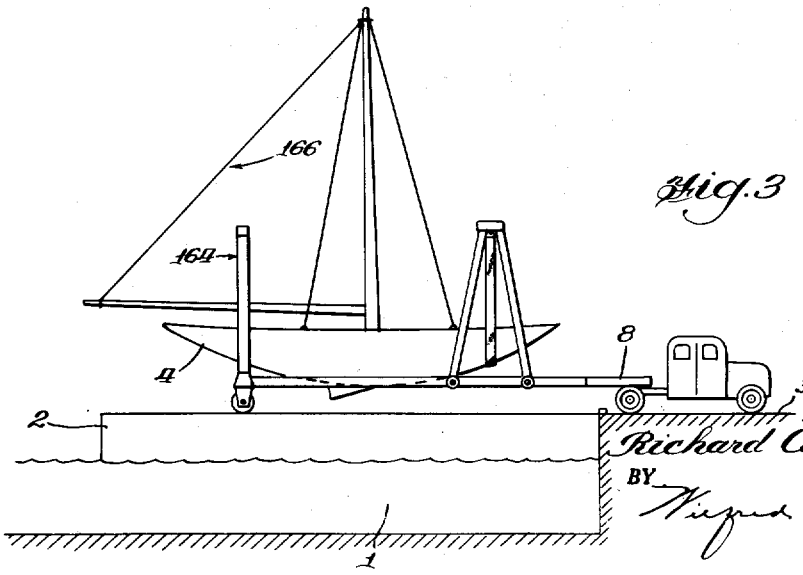

The boat is now moved into the slip until the positions shown in FIGURE 1 or FIGURE 3 are attained. If all of the rigging is above the gate 24, as in FIGURE 1, there is no problem. If, on the other hand, there is intervening rigging, it is necessary to obtain a through vertical opening in the rigging extending from the lowermost point, referring to FIGURE 3, i.e., 164, to a distance slightly greater than the total height that the boat is to be raised, i.e., to a point such as 166. The gate is thereupon closed by means of the handle 27, and locked by means of the chain 134. Thereupon, the sling-lifting mechanism of both gantries is started simultaneously and the boat raised to the position shown in FIGURE 3.

THE MOVABLE GANTRY

On the original 3- and 6-ton trailer hoists, such as that disclosed in applicant's copending application Serial No. 557,371, filed January 4, 1956, where the rear gantry was fixed, the forward gantry performed the single function of raising one end of the boat. Locking it to the rails was solely to prevent longitudinal movement on the rails. With the openable tail gate, applicant utilizes the forward gantry as a truss to limit twisting of the rails.

Referring to FIGURE 4, the gantry is composed of a transverse beam 170 supported at each end by two I-beams 172, 174, 176 and 178. Each pair of I-beams spreads outwardly in an inverted V-arrangement and their outside surfaces are spaced from each other by a distance slightly less than the spacing of the rails 12 and 14 so that their lower ends may be positioned between these rails. Tacked to the outer surfaces of the I-beams, 176, for example, is an inverted channel 180, see also FIGURE 12. This channel joins the two beams 176 and 178 on one side thereof and is strengthened by I-beam segments 182 and 184 which act as gussets.

Figure 14:
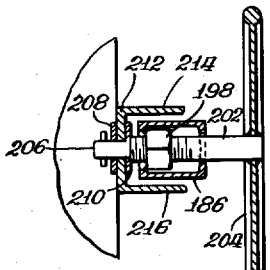
FIGURE 14 is a sectional view taken on the line 14—14 of FIGURE 12.

A pair of U-shaped channels 186 and 188 are spot welded in facing relationship to form a tubular member, see also FIGURE 14. Its upper end is welded to the outer surface of the side wall of the inverted channel 180 and to the outer bottom end of the gusset 184. Its lower end is held in spaced relationship by a pair of links such as 190, one end of each of which is bolted at 192 to the bottom of the associated I-beam such as 176, referring to FIGURE 12, and its other end is bolted at 194 to the tubular member generally indicated by the numeral 196. A heavy duty nut 198 is welded to the tubular member as shown in FIGURE 12 and in axial alignment with an opening 200.

Disposed in the nut 198 and the opening 200 is a heavy threaded shaft 202 on the outer end of which is keyed by suitable means a hand wheel 204. The other end 206 of the shaft 202 is reduced in diameter and between washers 208 and 210 is positioned a channel member 212, see both FIGURE 12 and FIGURE 14. This channel member 212 is free to rotate on the shaft 202, but it is maintained substantially in parallel relationship to the tubular housing 196 because the side walls 214 and 216 embrace the housing 196 as can be seen in FIGURE 14. The flat surfaces of the channel member 212 are immediately adjacent to the I-beam which constitutes the rail 12 of the frame. Mounted on the inner surface of the vertical member 176 is a plate 218 for engaging the adjacent edges of the bases of the I-beam, complementary to the action of the flat surface of the channel member 212. By turning the hand wheel 204 counterclockwise as viewed in FIGURE 11, the channel member 212 will be moved to the right as viewed in FIGURE 12, so that the assembly is no longer locked to the I-beam 12.

Figure 11:
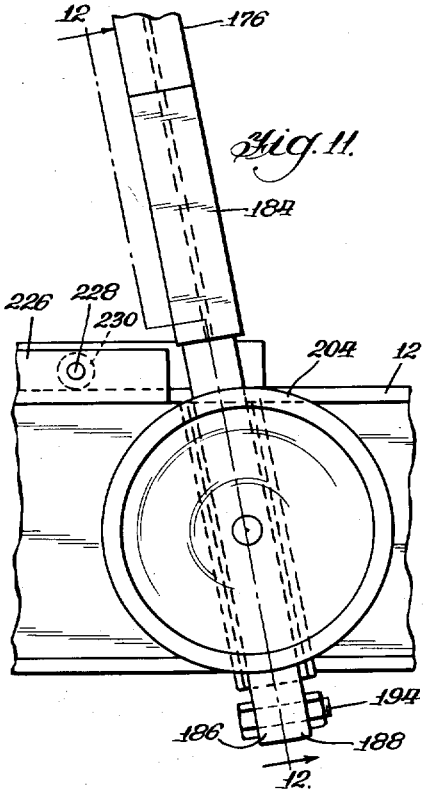
FIGURE 11 is an enlarged side elevation view of one of the assemblies for locking the movable gantry to the rail.
Figure 12:
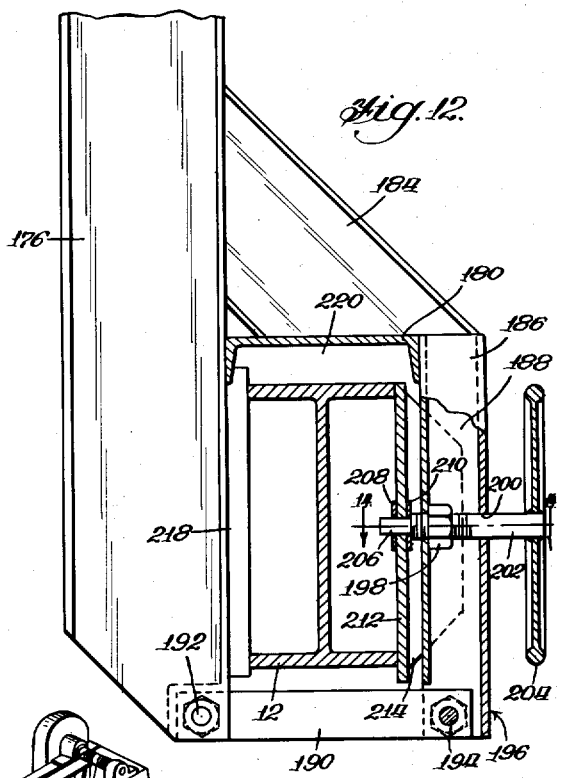
FIGURE 12 is a view taken on the line 12—12 of FIGURE 11.

The means for maintaining the spacing 220 in FIGURE 12 are rollers. Tacked to the outside wall and the inside wall of the channel members 180 are plates such as 222 and 224, see FIGURE 4. One of these plates 226 is shown in FIGURE 11. Mounted between the plate 226 and a corresponding plate, not shown, but on the far side, is a shaft 228 which carries a roller 230 which is flanged on at least one side to engage the edge of the I-beam 12.

It is evident that by pulling up the hand wheel such as 204 tightly, the uprights such as 176, see FIGURE 12, will be locked to the two rails 12 and 14 and the gantry will act as a truss between them so as to limit twisting movement of the rails 12 and 14 to points rearwardly of the forward gantry, and where an I-beam is used to stabilize the beam.

The gantry is moved lengthwise of the rails 12 and 14 by means of a combination cable chain drive. Referring to FIGURE 4, the cable 230 is entrained over a sheave 232 and its ends are connected respectively to a drive chain 234 entrained over a sprocket 236. The drive chain being much more expensive than the cable, has a length sufficient to move the gantry back and forth along the rail for the selected distance. A similar combination cable and drive chain, sheave and sprocket are mounted on the outer side of the rail 14. The drive sprockets, such as 236, are keyed to a shaft 238 which extends the width of the frame and carries a crank 240 on the side adjacent the driver's seat.

Figure 13:
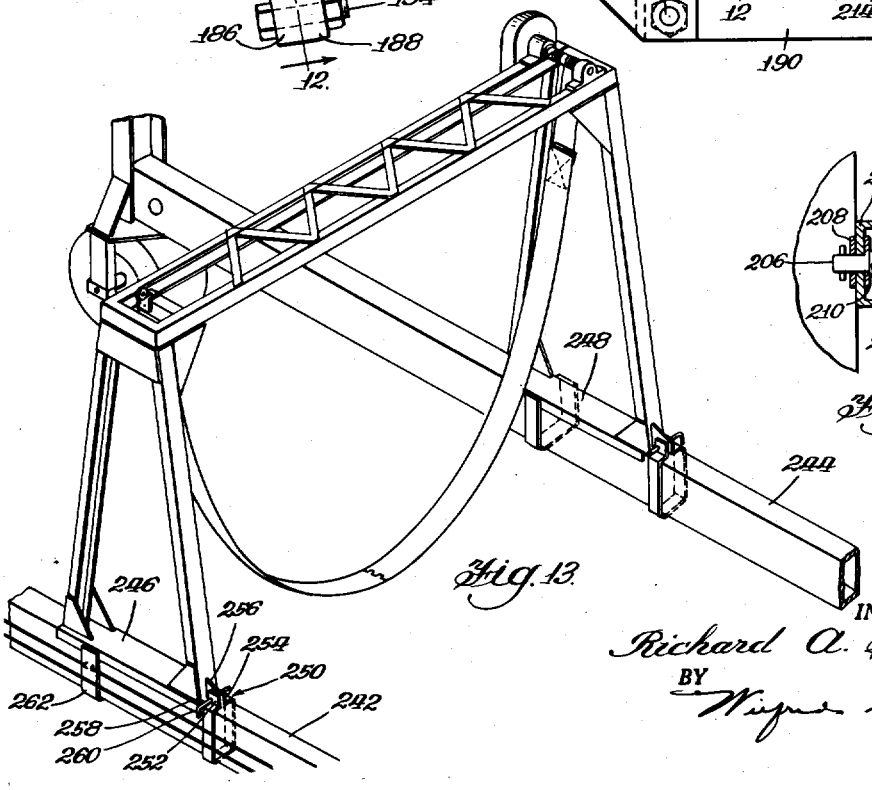
FIGURE 13 is a perspective view of a portion of another boat hoist in which the rails are rectangular in cross section.

In order to further reduce twisting at points rearwardly of the front frame, applicant is now building frames in which the rails have a rectangular cross section. This is illustrated in FIGURE 13 where the rails 242 and 244 have rectangular cross sections. Circular cross sections have been considered, but they create certain problems in provided a guideway for the movable gantry and in enabling one to lock the gantries to them. The portion of a trailer boat hoist shown in this FIGURE 13 is that of a small boat hoist. Here, the uprights of the gantry are mounted upon two inverted channel members 246 and 248. Between the under side of these channel members such as 246 and the top of the beam 242, are two or more rollers so that one may move the gantry lengthwise of the rails. In order to lock the gantry to the rails, applicant provides a simplified O-shaped bail 250. The bail has two facing end tongues such as 252 and 254 which are positioned on opposite sides of a leaf 246 on the outer side of the upright. A shaft 258 is appropriately threaded so that by turning the end 260 in one direction, the tongues are clamped to the leaf and also exert pressure on the sides of the rail 242. The depending bracket 262 is fastened to the inverted channel 246 and has a lower end portion which extends under the rail 242 to prevent upsetting of the gantry where the trailer encounters uneven ground or the like.

The two embodiments of the movable gantry shown in FIGURES 4 and 13 each carry a sling such as 264, referring to FIGURE 4. The sling has a pulley block at each end and a cable is reeved over each pulley, one end being fixed to the gantry and the other being carried over one of the two drums 266 and 268. Power is provided through a gear box 270 by a motor, not shown.

It will be appreciated that the horizontal gate is but one type of rear opening gate. It has advantages over a pivoted gate. A pivoted gate may be of different types. One may consist of an elongated member pivotally mounted on a vertical axis at one end on the upright 20 and swingable to the upright 22. Another type is also pivoted, but this time on a horizontal axis so that it may be raised straight vertically. In either one of these cases, the bending moment imposed on the upright 20 is very great. One of the advantages of the transversely movable beam shown in the application is that as it is retracted away from the upright 22, it tends to balance itself on top of the upright 20 and as it does so, it relieves stress upon the arm 12 of the frame.

Applicant's means for resisting bending moments caused by the upright 20 are all interacting. When the gate is opened, the rigid locking of the forward gantry 16 to the arms 12 and 14 cause the forward gantry to act as a truss between the two arms. The portion of the beam rearwardly of the gantry is alone required to resist twisting. Further cooperating is the use of bars of rectangular cross section.

When a boat is actually in the slings, it is, of course, of critical importance that the bar 122, caught in the latch 102, be tight. The upper flat surface 114 of the tail gate 24 engages the under flat surface of the member 118, as well as the side walls 110 and 112 which form the wedge recess. What applicant has attained is the substantial equivalent of a rectangular, parallelepiped frame without the limitations of such frame.

Having thus described his invention, what he claims is:

1. A U-shaped boat hoist frame comprising a base member, an arm extending rearwardly from each end of the base member so as to form a horizontally disposed U-shaped frame, means for movably supporting said frame horizontally above the ground, an inverted U-shaped gantry having vertical members movably supported respectively on said arms, means for locking the members to the arms so as to prevent twisting of the members around the arms under load, an upright near the free end of each arm, a cross member movably mounted near the top of one upright and having one end engageable with the second upright so as to span the two uprights, and means for locking the cross member to the second upright.

2. A U-shaped boat hoist frame comprising a base member, an arm extending rearwardly from each end of the base member so as to form a horizontally disposed U-shaped frame, means for movably supporting said frame horizontally above the ground, an inverted U-shaped gantry having vertical members movably supported respectively on said arms, means for locking the members to the arms so as to prevent twisting of the members around the arms under load, an upright near the free end of each arm, a cross member disposed horizontally near the top of the first upright and movable transversely of the upright so that one end may engage the second upright so as to span the two uprights, and means for locking said end to the second upright.

3. The boat hoist frame of claim 2 wherein the arms of the frame have a rectangular cross section.

4. A U-shaped boat hoist frame comprising a base member, an arm extending rearwardly from each end of the base member so as to form a horizontally disposed U-shaped frame, means for movably supporting said frame horizontally above the ground, an inverted U-shaped gantry having vertical members movably supported respectively on said arms, means for locking the members to the arms so as to prevent twisting of the members around the arms under load, an upright near the free end of each arm, rollers mounted near the top of one upright in a horizontal plane with their axes parallel to the arms of the frame, an elongated member slideable lengthwise on said rollers so that one end will engage the second upright so as to span the two uprights, and means for locking said end to the second upright.

5. The boat hoist frame of claim 4, wherein the end engageable with the second upright is tapering and the second upright has a mating socket to receive it.

6. The boat hoist frame of claim 5, wherein the end engageable with the second upright is tapering and carries a latch keeper and the second upright has a mating socket to receive said tapering end and a latch for positively drawing and holding the tapering end in the socket.

7. A U-shaped boat hoist frame comprising a base member, an arm extending rearwardly from each end of the base member, means for movably supporting said frame horizontally above the ground, an inverted U-shape gantry having vertical members supported respectively on said arms, an upright near the free end of each arm, a cross member disposed horizontally near the top of the first upright and movable transversely of the upright so that one end may engage the second upright, means for locking said end to the second upright, means including drums mounted on the second upright for reeling cables, and an upwardly open sheave mounted on the first upright whereby when two cable ends are attached to the ends of a sling, one cable may be entrained over the open sheave without disconnecting the sheave.

8. A boat hoist comprising a horizontally disposed, U-shaped frame, means for movably supporting said frame above the ground, an upright mounted on the free end of each leg of the frame, a removable cross member for connecting the upper ends of said uprights, an inverted U-shaped gantry having vertical members movably supported at their lower ends respectively on the arms of the frame, and locking means on the bottom of each leg of the movable gantry for clamping to each arm of the frame and preventing tortional movement of the free end of the arm.

9. The boat hoist of claim 8 wherein the transverse member connecting the upper ends of the upright is a movable gate and wherein each leg of the forward gantry contacts the associated arm of the base for a substantial distance whereby the locking means holds the arm of the frame not only from tortional twisting but rigidly along the length connected to the leg of the gantry.

*10. A U-shaped boat hoist frame comprising first and second horizontally disposed parallel arms forming a frame, means for movably supporting said frame horizontally above the ground, an inverted U-shaped gantry having vertical members movably supported respectively on said arms, means for locking the members to the arms so as to prevent twisting of the members around the arms under load, an upright near one end of each of said arms, a cross-member movably mounted near the top of one upright and having one end engageable with the second upright so as to span the two uprights, and means for locking the cross-member to the second upright.*

*11. A boat hoist comprising first and second disposed parallel members forming a frame, means for movably supporting said frame above the ground, an upright mounted on one of the ends of each of said members, a movable cross-member for connecting the upper ends of said uprights, an inverted U-shaped gantry having vertical members movably supported at their lower ends respectively on the members of the frame, and locking means on the bottom of each leg of the movable gantry for clamping to each member of the frame and preventing tortional movement of the free end of the member.*

*12. A hoist comprising first and second horizontally disposed parallel members forming a frame, means for movably supporting said frame above the ground, an inverted U-shaped gantry having vertical legs supported respectively on adjacent ends of said members, first and second uprights respectively supported on said first and second members, a cross-member disposed horizontally near the top of the first upright and movable transversely of the upright so that one end may engage the second upright, means for locking said end to the second upright, means including drums mounted on the second upright for reeling cables, and an upwardly open sheave mounted on the first upright whereby when two cable ends are attached to the ends of a sling, one cable may be entrained over the open sheave without disconnecting the sheave.*

References Cited in the file of this patent or the original patent

UNITED STATES PATENTS

| | | |
|---|---|---|
| 505,638 | Rasch | Sept. 26, 1893 |
| 890,151 | Marshall | June 9, 1908 |
| 1,543,686 | Wengraf | June 30, 1925 |
| 1,671,252 | Moore | May 29, 1928 |
| 2,099,078 | Romine | Nov. 16, 1937 |
| 2,424,899 | Priester | July 29, 1947 |
| 2,452,938 | Krake | Nov. 2, 1948 |
| 2,509,067 | Leach | May 23, 1950 |
| 2,644,545 | North | July 7, 1953 |
| 2,750,197 | Tripp | June 12, 1956 |

FOREIGN PATENTS

| | | |
|---|---|---|
| 470,114 | Great Britain | Aug. 10, 1937 |